Figure 1:
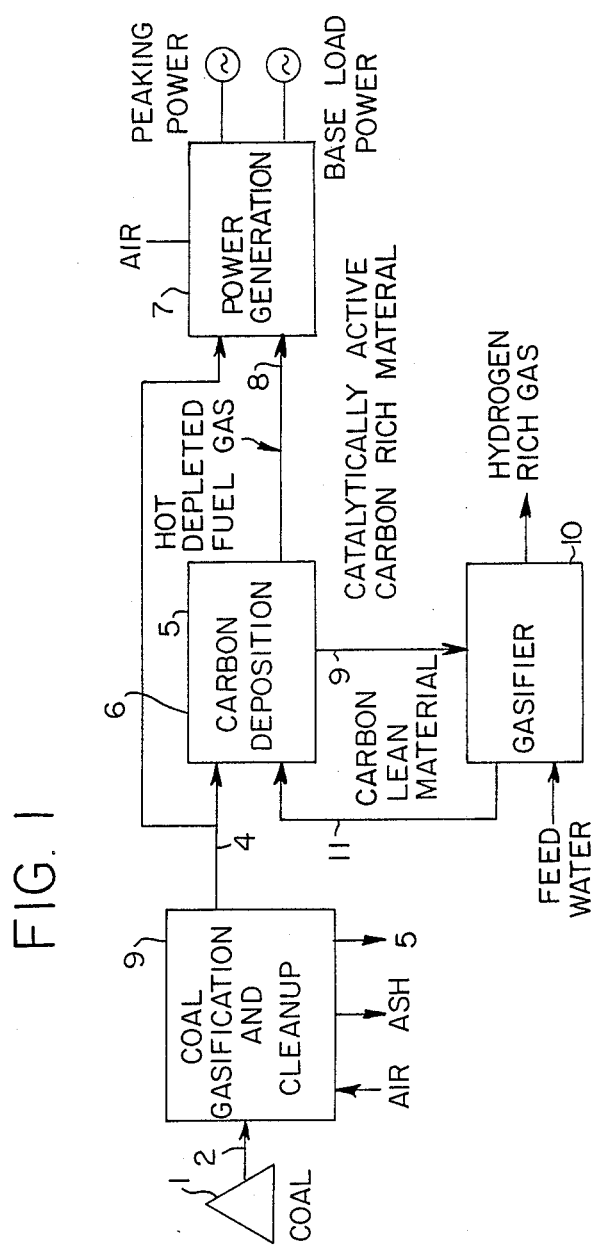

United States Patent [19]

Koutsoukos

[11] Patent Number: 4,873,214
[45] Date of Patent: Oct. 10, 1989

[54] CARBONACEOUS MATERIAL FOR PRODUCTION OF HYDROGEN FROM LOW HEATING VALUE FUEL GASES

[75] Inventor: Elias P. Koutsoukos, Los Angeles, Calif.

[73] Assignee: TRW Inc., Redondo Beach, Calif.

[21] Appl. No.: 70,627

[22] Filed: Jun. 30, 1987

Related U.S. Application Data

[63] Continuation of Ser. No. 685,882, Dec. 24, 1984, abandoned.

[51] Int. Cl.⁴ .................... B01J 21/18; C01B 31/02; C01B 3/02; C10K 3/04
[52] U.S. Cl. ........................ 502/185; 48/197 R; 48/203; 423/459; 423/648.1; 502/438
[58] Field of Search ............... 502/185, 182, 438; 423/447.3, 459, 461

[56] References Cited

U.S. PATENT DOCUMENTS 4,591,334  5/1986  Brooks ............................ 502/182
4,642,125  2/1987  Burk et al. ..................... 48/197 R
4,650,657  3/1987  Brooks ............................ 502/182

FOREIGN PATENT DOCUMENTS

WO82/03380  10/1982  PCT Int'l Appl. ........... 48/197 R

Primary Examiner—Paul E. Konopka
Attorney, Agent, or Firm—Jeffrey G. Sheldon; Sol L. Goldstein

[57] ABSTRACT

A process for the catalytic production of hydrogen, from a wide variety of low heating value fuel gases containing carbon monoxide, comprises circulating a carbonaceous material between two reactors—a carbon deposition reactor and a steaming reactor. In the carbon deposition reactor, carbon monoxide is removed from a fuel gas and is deposited on the carbonaceous material as an active carbon. In the steaming reactor, the reactive carbon reacts with steam to give hydrogen and carbon dioxide. The carbonaceous material contains a metal component comprising from about 75% to about 95% cobalt, from about 5% to about 15% iron, and up to about 10% chromium, and is effective in suppressing the production of methane in the steaming reactor.

4 Claims, 3 Drawing Sheets

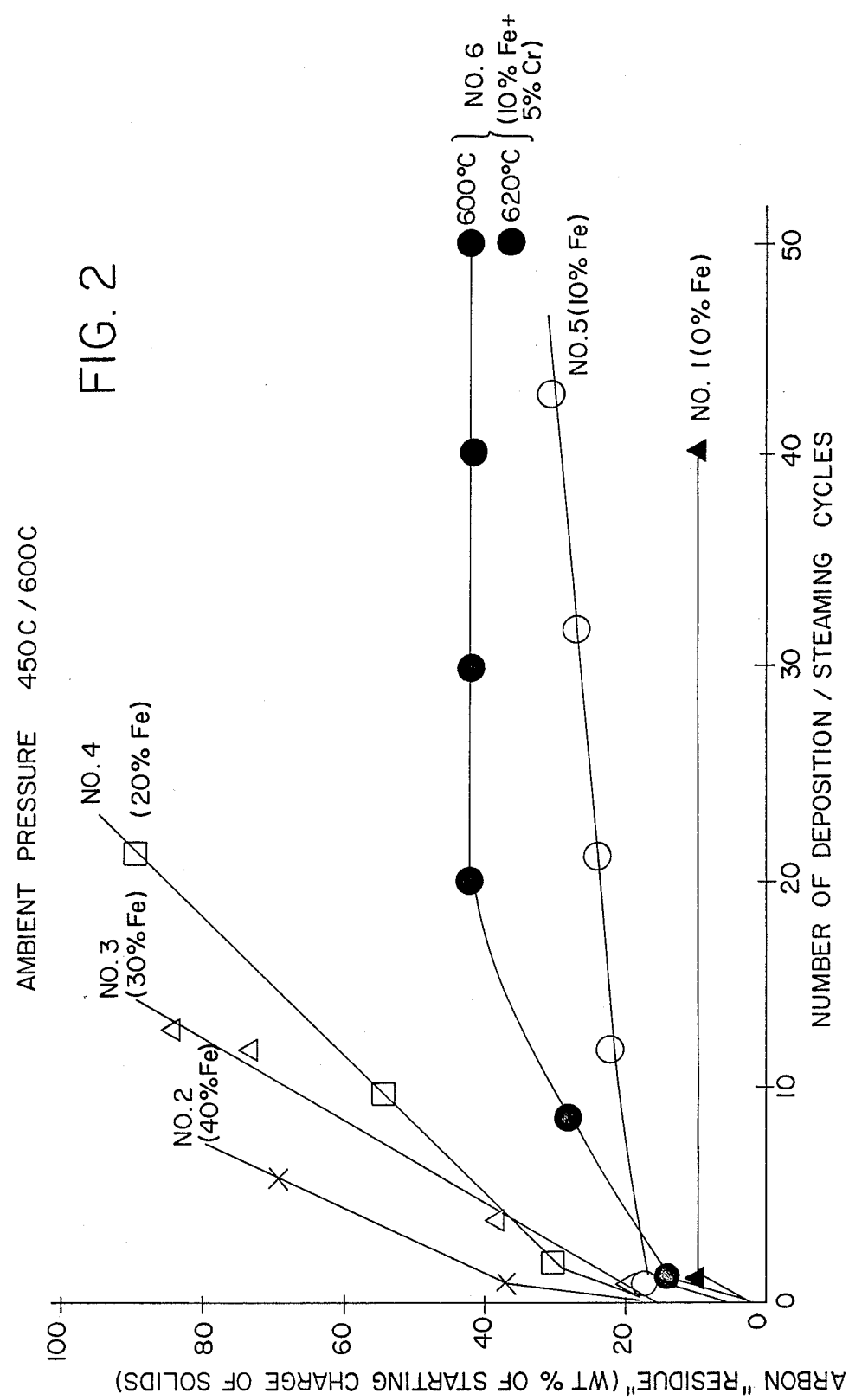

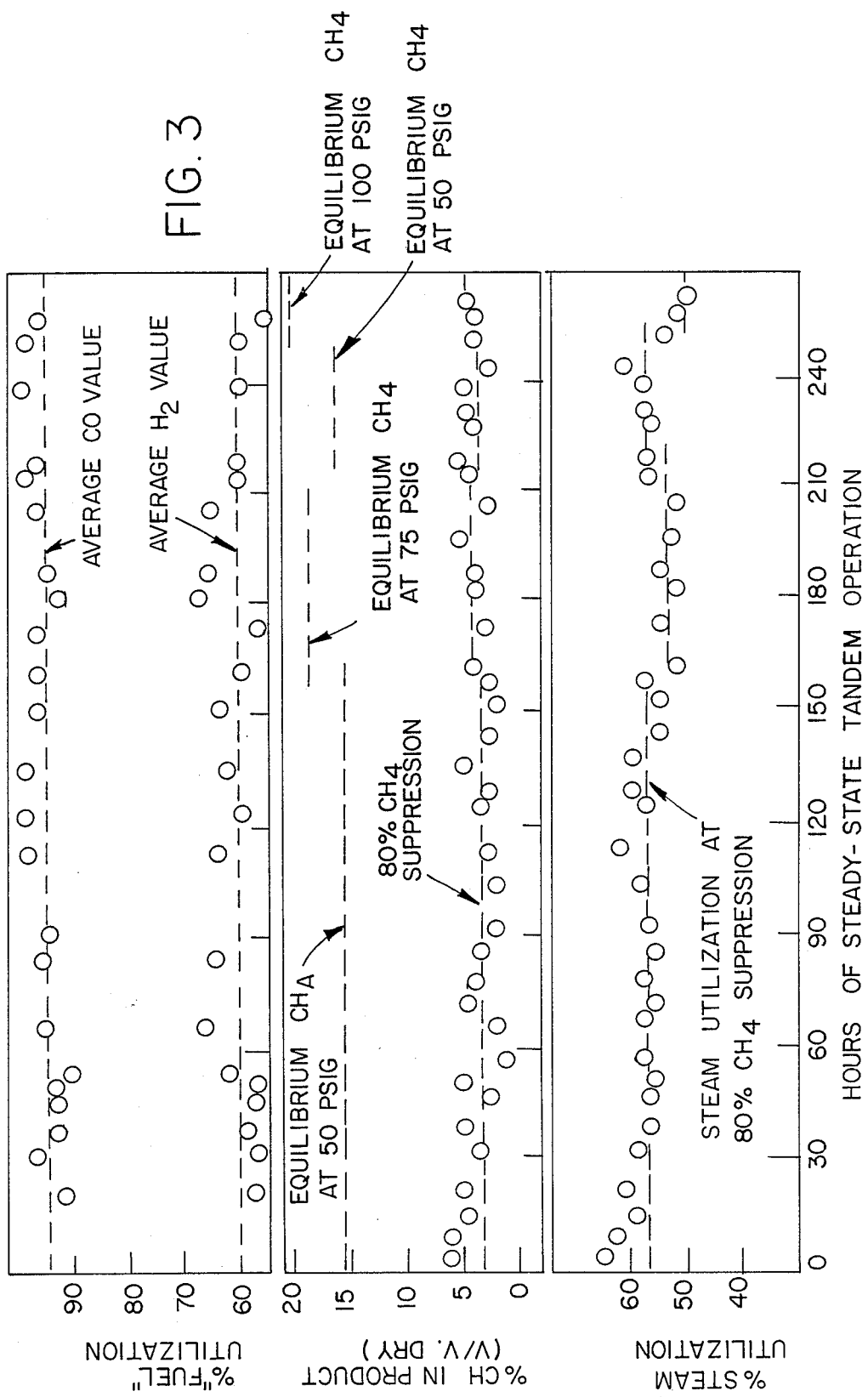

CARBONACEOUS MATERIAL FOR PRODUCTION OF HYDROGEN FROM LOW HEATING VALUE FUEL GASES

The government of the United States of America has rights in this invention pursuant to Contract. No. DE-FC21-80MC14400 awarded by the United States Department of Energy.

This application is a continuation of application Ser. No. 685,882, filed Dec. 24, 1984 now abandoned.

CROSS-REFERENCES

This application is related to application Ser. No. 557,405 filed Nov. 30, 1983 by Burk et al., now U.S. Pat. No. 4,642,125 which is incorporated herein by this reference. This application is also related to Application Ser. No. 620,996 filed June 15, 1984 by Brooks, now U.S. Pat. No. 4,650,657 which is incorporated herein by this reference.

BACKGROUND

The present invention relates to the catalytic production of hydrogen from low heating value gases.

The consumption of hydrogen is expected to increase appreciably in established industries such as the manufacture of fertilizers and chemicals, and oil refining. Also, significant consumption of hydrogen is forseeable for use in fuel cells, and in the production of synthetic fuels from coal and oil shale. The principal source of hydrogen today is the steam reformation of methane. But methane itself is a relatively expensive and depletable chemical. A new source of hydrogen is needed both for economic and availability reasons.

SUMMARY

The present invention provides an effective process for production of hydrogen from a wide variety of low heating value gases which contain carbon monoxide and hydrogen. In the process, a carbonaceous material is cycled between a steam gasification zone and a carbon deposition zone.

In the steam gasification zone, carbon-enriched carbonaceous material is reacted with steam at a temperature from about 500° to about 700° C., and a pressure of from about 1 to about 15 atmospheres. The carbon in the carbon-enriched carbonaceous material is gasified to produce (i) a hydrogen-rich gas stream containing hydrogen and no more than about 5 mole percent methane on a dry basis and (ii) a carbon-lean carbonaceous material. The hydrogen-rich gas stream and carbon-lean carbonaceous material are withdrawn from the steam gasification zone.

The carbon-enriched carbonaceous material comprises from about 55 to about 98% by weight carbon, from about 1 to about 44% by weight metal component, and from about 0.1 to about 1% by weight hydrogen. The metal component comprises from 75 to 95% by weight cobalt, from 5 to 15% iron, and from 0 to 10% chromium. Preferably there is at least 1% by weight chromium in the metal component.

Preferably a fibrous carbonaceous material is used. The carbonaceous material includes a major phase and a minor phase. The major phase comprises from about 95 to about 99.9% by weight carbon, from about 0.1 to about 1% by weight hydrogen, and the balance, if any, being the metal component. The minor phase is nodules which are dispersed throughout the major phase and are intimately associated with and at least partly bonded to the carbon in the major phase. The minor phase comprises carbon and at least 50% by weight of the metal component.

The composition of the metal component is critical to the present invention. It has been determined that cobalt gives excellent reaction rates. But cobalt is not highly hydrogen selective. It has been discovered that by including at least 5% iron in the cobalt catalyst, formation of methane is greatly suppressed, while the reaction rates remain high. It has been discovered that inclusion of chromium in the metal component further suppresses formation of methane. It has also been determined that it is important to limit the amount of iron to a maximum of 15%, or else the carbonaceous material has a short active life.

In the carbon deposition zone, the withdrawn carbon-lean carbonaceous material is reacted with a low heating value fuel gas at a temperature above about 350° C. to deposit carbon on the carbon-lean material. This forms the carbon-enriched carbonaceous material and a hot depleted low heating value fuel gas. The carbon-enriched carbonaceous material is then circulated to the steam gasification zone.

Thus, the process of the present invention can be used for producing hydrogen, while suppressing methane production, from a low heating value fuel gas.

DRAWINGS

These and other features, aspects, and advantages of the present invention will become better understood with reference to the following description, appended claims, and accompanying drawings where:

FIG. 1 is a flow sheet of an embodiment of a process according to the present invention;

FIG. 2 is a plot of unreacted carbon remaining in carbonaceous materials after steam gasification versus the number of times the carbonaceous materials were cycled between a steam gasification zone and a carbon deposition zone; and FIG. 3 presents fuel utilization, percent methane in product gas, and steam utilization as a function of processing time for a process according to the present invention.

DESCRIPTION

The Process

This invention relates to a new process for producing hydrogen. A carbonaceous material comprising (a) carbon, (b) a metal component comprising cobalt and iron and which also can comprise chromium, and (c) hydrogen is reacted with steam. This process produces commercially attractive yields of hydrogen in commercially attractive temperature and pressure ranges.

In general, a process according to the present invention involves circulating the carbonaceous material between two reactors, a carbon deposition reactor and a steam gasification reactor. In the carbon deposition reactor, a low heating value fuel gas feedstock contacts a carbon-lean carbonaceous material, resulting in the rapid deposition of a very reactive carbon on the carbonaceous material, by reactions of the types:

$$2CO \rightarrow C^* + CO_2 \qquad (1)$$

$$CO + H_2 \rightarrow C^* + H_2O \qquad (2)$$

The carbon-enriched carbonaceous material thus formed is then circulated to a steam gasification or steaming reactor, where the material is contacted with steam. The following principal reactions take place in the steaming reactor:

$$2C^* + 2H_2O \rightarrow CH_4 + CO_2 \quad (3)$$

$$C^* + 2H_2O \rightarrow 2H_2 + CO_2 \quad (4)$$

Because hydrogen has a higher commercial value than methane, it is desirable to suppress methane production in the steaming reactor, i.e. suppression of reaction (3) is desirable. As described in detail below, the process of this invention is capable of achieving 80% methane suppression at near equilibrium steam utilization because of the particular metals used in the carbonaceous material.

FIG. 1 is a block diagram showing a process according to the present invention. Coal from a source 1 passes on path 2 to a coal gasification and cleanup zone 3. There the coal is partially oxidized with air to form a gaseous mixture of nitrogen, carbon monoxide, carbon dioxide, and hydrogen. The ash, sulfur and water content of the mixture are reduced to acceptable levels by known methods. An advantage of the process of the present invention is that the coal can be burned with air rather than oxygen because the process is compatible with feed stocks containing substantial amounts of nitrogen and carbon dioxide. The low heating value fuel gas then passes along path 4 to a carbon deposition zone 5 where formation of carbon enriched carbonaceous material occurs by deposition of carbon on carbon-lean carbonaceous material. If desired, some of the low heating value fuel gas may pass directly along path 6 to a power generation zone 7 for combustion with air to generate base loading and/or peaking power. Hot depleted fuel gas discharged from the carbon deposition zone 5 passes on path 8 to the power generation zone 7.

Carbon-rich carbonaceous material passes on path 9 to a steam gasification zone 10 for reaction with steam to produce hydrogen, carbon dioxide, and small amounts of methane and carbon monoxide. Carbon-lean carbonaceous material is circulated from the gasification zone 10 to the carbon deposition zone 5 through path 11. Nearly all of the heating value of the carbonaceous material can be converted to hydrogen and some methane in the steam gasification zone 10.

Following the process steps shown in FIG. 1, from about 25 to about 50% of the initial heating value from a carbon monoxide/hydrogen-containing fuel gas can be withdrawn in the form of carbon, and then the depleted fuel gas can be used as an energy source to generate electric power or to produce power quality steam. The withdrawn carbon can be steam gasified to convert from about 40% to about 80% of the carbon to hydrogen, carbon oxides, and some methane and other light hydrocarbons.

Measurements of Process Effectiveness

There are a variety of measurements of the effectiveness of the process of the present invention, including:

"Percent methane suppression" is a measure of the selective reaction of the carbonaceous materials with steam to form hydrogen to the exclusion of methane, i.e. preference of reaction (4) over reaction (3) above. The theoretical concentrations of each of the major gaseous components in the steaming reaction product gas, namely hydrogen, methane, carbon monoxide, and carbon dioxide, can be computed using thermodynamic data for equilibrium operation, assuming no methane suppression. Another set of theoretical concentrations can also be computed, assuming that no methane is generated (100% methane suppression). The actual reaction product has a composition falling between the two. Percent Methane Suppression, which quantifies the effectiveness of methane suppression, is computed by the formula:

% Methane Suppression = $[1 - (Ma/Mt)] \times 100$ where
Ma (methane actual) = methane concentration measured
Mt (methane theoretical) = methane concentration theoretical unsuppressed The larger the percent methane suppression, the more effective is the carbonaceous material used.

"Percent steam utilization" is a measure of the percent of steam fed into the steaming reactor which reacted with the reactive carbon of the carbonaceous material. Theoretical values can be computed from thermodynamic data for equilibrium operations, for both no methane suppression and 100% methane suppression. The actual steam utilization can then be compared with the theoretical values. The closer the actual steam utilization is to the theoretical steam utilization for total methane suppression, the better is the effectiveness of the process.

Another measure of the effectiveness of methane suppression is the "hydrogen-to-methane ratio", measured as a ratio of the concentration of hydrogen to methane in the steaming reactor product gas. The higher the ratio, the more effective is the methane suppression.

An important measure of the commercial viability of the process is the "active life" of the carbonaceous material. It is the measure of the life of the material, during which it can be effectively used in the catalytic production of hydrogen in a process of this invention. The process involves cycling the carbonaceous material between the carbon deposition reactor and the steaming reactor. Even with the catalytic action of the metal components, the carbon deposition step is not one hundred percent efficient. That is, the deposited carbon may not totally be of the reactive type. The accumulation of the inactive or less active carbon ("carbon residue") slowly renders the carbonaceous material inactive after a number of carbon deposition/steaming cycles, as the steaming only removes the active carbon. It is desirable to have carbonaceous materials that have long active lives and which provide good carbon gasification rates and satisfactory methane suppression even after many carbon deposition/steaming cycles. The longer the active life of the carbonaceous material, the less it is necessary to disrupt the production process to replace the material.

The carbonaceous materials used in the process of this invention give near equilibrium steam utilization (fast gasification rates), greater than about 80% methane suppression, and an active life of at least 50 cycles.

There will now be discussed the details of a process according to the present invention.

Feed

The low heating value fuel gas fed to the carbon deposition zone 5 can be any low pressure or high pressure producer or synthesis gas such as blast furnace gas, or the gas formed by partial oxidation of coal in the presence of air (as shown in FIG. 1). In general, any gas containing CO and $H_2$ is suitable. This ability to handle a wide variety of gas feedstocks is an important advantage of this invention. The gas mixtures can include substantial quantities of nitrogen and carbon dioxide, but must contain little or no sulphur compounds such as hydrogen sulfide, carbon disulfide or sulphur dioxide. If necessary, carbon monoxide-containing gas mixtures are pretreated by known methods for removing sulphur containing gases before carbon deposition begins.

Carbonaceous Material

The material fed to the steam gasification zone 10 comprises from about 55 to about 98% by weight carbon, from about 1 to about 44% by weight metal component, and from about 0.1 to about 1% by weight as hydrogen. The metal component comprises 75 to 95% by weight cobalt, 5 to 15% by weight iron, and from 0 to 10% chromium, and preferably at least 1% by weight chromium.

The carbonaceous material includes a major phase and a minor phase. The major phase comprises from about 95 to about 99.9% by weight carbon, from about 0.1 to about 1% by weight hydrogen, and the balance, if any, being the metal component. The minor component is nodules which are dispersed throughout the major phase and are intimately associated with and at least partly bonded to the carbon in the major phase. The minor phase comprises carbon and at least 50% by weight metal component.

It is important that the metal component has the above composition for the process to achieve the combination of high methane suppression, high steam utilization, high hydrogen-to-methane ratio in the product, high carbon gasification in the gasifier, and a long active life of the carbonaceous material.

The carbonaceous material used in the process according to the present invention preferably is fibrous in nature. However, it can also be non-fibrous. For example, it can be granular. Measured by low temperature gas adsorption methods, the preferred fibrous carbonaceous material has total surface area in the range of about 100 to about 300 square meters per gram of fibrous carbonaceous material, and a pore volume in the range of about 0.3 to about 0.6 milliliters per gram of fibrous carbonaceous material. The preferred method of preparing the preferred carbonaceous material is disclosed by Brooks in the previously mentioned Application Ser. No. 620,996.

A surprising aspect of the present invention is the importance of including a small amount of iron in the metal component. It was found that a carbonaceous material as described above, but containing only cobalt as the metal component, gives high steam utilization rates, which equates to near equilibrium reaction rates. However, as shown in the examples that follow, the cobalt-only catalyst is not highly hydrogen-selective. That is, the cobalt-only catalyst does not give good methane suppression, but rather it produces methane in equilibrium amounts. It was also discovered that a carbonaceous material having only iron as the metal component very quickly becomes inactive, due to accumulation of carbon residue. Higher steam gasification temperatures are also required with iron than with cobalt.

However, by including a small amount of iron, i.e. at least 5% by weight, in a cobalt-only metal component, superior and unexpected results are obtained. The reaction rates remain near equilibrium. Moreover, methane suppression is greatly improved. Also, the carbonaceous material has an active life comparable to that having a cobalt-only metal component. The amount of iron is at least 5% to obtain effective suppression of methane production. Preferably the amount of iron is 10% by weight. If the iron content is more than about 15% by weight, the length of the active life of the carbonaceous material is adversely affected, i.e. the carbonaceous material cannot be used for as many gasification/deposition cycles.

Methods for making the carbonaceous materials generally comprise depositing carbon from carbon monoxide-containing gas mixtures over one or more metal initiators. In the process of carbon deposition, metal is transferred from the initiator to the carbonaceous material and becomes an integral part of these materials as described above. The metal starting materials, called initiators in the deposition reaction to distinguish them from the metal components in the carbonaceous materials, can be supported or unsupported metals, ores, alloys. or mixtures of such species.

Gasification Zone

The carbonaceous materials are highly reactive with steam in the gasifier 10 at pressures in the range of from about 1 to about 15 atmospheres and at temperatures in the range of about 500° to about 700° C. From the steaming reactions, a product gas is produced that includes hydrogen, carbon dioxide, carbon monoxide, methane, and other light hydrocarbons. The quantities of each gas produced in the steaming reactors depend on the nature of the carbonaceous material and the temperature and pressure at which the steam gasification takes place.

Preferably the temperature in the steam gasification zone is from about 550° to about 650° C. Preferably the pressure in the steam gasification zone is from about 1 to about 10 atmospheres. Pressure has no significant effect on the rate at which steam gasification material proceeds, but does affect the composition of the product gas obtained. In general, methane suppression effectiveness decreases with increased pressure, although not to a significant extent. Better than 80% suppression of methane can be maintained at a pressure of less than 100 psig at 620° C.

The molar ratio of steam fed to carbon gasified can be near the ratio for thermodynamic equilibrium. Generally at least 40%, and up to about 80%, of the carbon of the carbon-enriched carbonaceous material in the steam gasification zone reacts with steam and is gasified thereby. This contributes to the high efficiencies achieved with the process of the present invention.

Deposition Zone

In the carbon deposition zone 5, carbon-lean carbonaceous material formed in the steam gasification zone 10 is reacted with a low heating value fuel gas at a temperature above about 350° C., and generally up to about 500° C. to deposit carbon thereon. This forms the carbon-enriched carbonaceous material that is fed to the steam gasification zone. In the carbon deposition zone, generally at least 25% by weight of the carbon in the low heating value fuel gas deposits on the carbonaceous material. This also contributes to the high efficiency of the process according to the present invention.

Carbon deposition removes carbon from the carbon monoxide-containing gas mixtures at nearly 100 percent thermal efficiency since the heat of reaction may remain as sensible heat in the carbon monoxide-depleted fuel gas streams. The reaction heated, carbon-monoxide depleted gas mixture from the carbon deposition reaction is a good fuel source for generating combined cycle electric power.

EXAMPLES

The following examples demonstrate the effectiveness of the present invention.

EXAMPLE 1

Example 1 demonstrates that a hydrogen generation process according to the present invention is superior to similar processes that use a carbonaceous material having a different metal component.

Cobalt based carbonaceous materials were tested in a laboratory scale screening apparatus, consisting of a feed manifold, a microreactor, a product conditioning system, and instrumentation for monitoring reactant and product flow rates and composition. The feed manifold was used to blend bottled $H_2$, $CO_2$, and $N_2$ to give a low BTU feed gas used for carbon deposition. A microboiler fed by a syringe-pump was used to produce a constant flow of feed steam to a reactor during a steaming cycle. The reactor consisted of a U-shaped quartz tube equipped with a shielded thermocouple for temperature measurement and control. A proportionally controlled electric furnace was used to heat the reactor.

Product gases generated were cooled by means of an ice bath chilled condenser and fed to a gas chromatograph and an automatic recording gas volume flowmeter. Carbon mass balances of ±4% were reproducibly achieved.

The reactor was operated in batch mode with respect to solids, but continuous, steady state mode with respect to feed gases. A charge of 0.5 to 2.0 grams of the carbonaceous material was used. During carbon deposition/steaming multi-cycle testing, carbon was steam gasified to the desired level and carburized back to the original weight. The rates of carbon deposition or gasification were determined from the differences in carbon content of the feed and product gas streams as a function of time. The accuracy of the carbon balances was checked by weighing the reactor solids at the end of each operation. Hydrogen and oxygen elemental balances were also computed to determine the quality of data being generated.

The composition of the metal component of the carbonaceous materials tested is shown in Table 1. The metal components of the carbonaceous materials were prepared by various methods including:

(a) thermal decomposition of the nitrate of the metals;

(b) precipitation of the metals with aqueous sodium carbonate, followed by thermal decomposition of the precipitate;

(c) using the metal or metal oxide as commercially available;

(d) precipitation of the metal with aqueous ammonium carbonate, followed by thermal decomposition of the precipitate; and (e) thermal decomposition of the metal oxalates.

It was found that the method of metal component preparation had very little effect on hydrogen selectivity, provided that the metal component was subjected to a temperature of at least 400° C. during the decomposition or oxidation step.

It was also found that pretreatment of the metal components with steam at 750° C. or hydrogen gas at 350° C. or 750° C. did not have any significant effect on the effectiveness of the carbonaceous material.

Exemplary of the procedure for forming the metal component is the procedure used for Material 6, the metal component consisting of 85% cobalt, 10% iron and 5% chromium.

TABLE 1

RATE AND SELECTIVITY PERFORMANCE OF MODIFIED COBALT CATALYSTS IN HYDROGEN PRODUCTION FROM LOW BTU FEEDS (Data generated at 600° C. and atmosphere pressure except as noted)

| Material No. | Metal Composition % Wt. Co, Fe, Cr | Steam Utilization (% of Feed) | | | | Hydrogen-to-Methane Ratio, v/v | | | | Carbon Residue Fraction of Starting "Charge" | | |
|---|---|---|---|---|---|---|---|---|---|---|---|---|
| | | Theoret. | 1st Cycle | 10th Cycle | 40th Cycle | Theoret. | 1st Cycle | 10th Cycle | 40th Cycle | 1st Cycle | 10th Cycle | 40th Cycle |
| 1 | 100/0/0 | 71*/66** | 71 | 71 | 71 | 5.6 | 5.6 | 5.6 | 5.6 | .20 | No Data | ~.20 |
| 2 | 60/40/0 | 74*/70** *** | 60 | 58 (6th Cycle) | N.A. | 7.3*** | 19 | >60 (6th Cycle) | N.A. | .37 | .70 (6th Cycle) | N.A. |
| 3 | 70/30/0 | 71*/66** | 54 | 44 | N.A. | 5.6 | 17 | >60 | N.A. | .19 | .50 | .85 (13th Cycle) |
| 4 | 80/20/0 | 74*/70** *** | 65 | 68 | N.A. | 7.3*** | 28 | 56 | N.A. | .30 | .40 | .90 (20th Cycle) |
| 5 | 90/10/0 | 71*/66** | 66 | 65 | 65 | 5.6 | 14 | 30 | 39 | .17 | .24 | .33 |
| 6 | 85/10/5 | 71*/66** | 66 | 66 | 65 | 5.6 | 7 | >60 | >60 | .13 | .34 | .42 |

*Normal graphite-steam equilibrium (methane is permitted to form).
**Graphite-steam equilibrium with methane production suppressed to zero.
***Steamed at 600–625° C., ambient P; thus, theoretical values are for 625° C.
N.A. These catalysts had lost activity much before the 40th cycle (too much "inactive"carbon residue).

In the procedure, 42 grams of $CO(NO_3)_2:6H_2O$ (8.5 grams Co), 7.23 grams $Fe(NO_3)_3:9H_2O$ (1.0 grams Fe), and 3.85 grams $Cr(NO_3)_3:9H_2O$ (0.5 grams Cr) were dissolved in one liter of deionized water. Twenty grams of $Na_2CO_3$ were then dissolved in 0.5 liter deionized water. The two solutions were mixed with vigorous and constant agitation for about 15 minutes and then let stand for about half an hour. The mixture was then filtered. If the filtrate was more than "slightly pink", the whole precipitation process was repeated. The precipitate was then dried in air at 200° C. and then decomposed in air at 400° C. for at least four hours. About 14 grams of oxides were produced.

The metal components were then carburized at about 420° to 450° C. (about 1.35 grams of the oxide reacting to form about 10 grams carbon enriched carbonaceous material) for hydrogen production. An 85% CO/15% $H_2$ gas mixture was used. The carbon-enriched carbonaceous solids were then steamed at about 600° C. to 650° C.

Each sample of carbonaceous material was subjected to carbon deposition/steaming cycles. In each cycle, carbon was gasified at atmospheric pressure and at a temperature of 600° to 625° C. until steam utilization dropped below 40%; that is, when virtually all the active carbon was gasified in each cycle.

The steam utilization, hydrogen-to-methane ratio, and carbon residue after gasification for each sample are presented in Table 1.

As shown by Table 1, carbonaceous materials 5 and 6 were the best. These materials achieved near equilibrium steam utilization at 600° to 625° C., hydrogen-to-methane ratios significantly greater than theoretical values, and low carbon residue at 40 cycles. These materials were stable and allowed greater than 80% methane suppression. The presence of chromium improved the hydrogen to methane ratios as comparison of the results obtained with material 6 (5% chromium) compared to material 5 (no chromium) shows. The other materials were not acceptable for one or more of the following reasons: (a) low steam-utilization (materials 2 and 3); (b) low hydrogen-to-methane ratio, i.e. low methane suppression (material 1); and (c) excessive accumulated "inactive" carbon residue, i.e. short active life (materials 2, 3 and 4).

At forty cycles, both materials 5 and 6 maintained excellent methane suppression characteristics (high $H_2$ to $CH_4$ ratio) of 39 and >60, respectively. Also, the carbon residue was low for these two materials, indicating they have long active lives.

FIG. 2 is a plot of the carbon residue versus number of cycles for each material tested. The preferred materials, Nos. 5 and 6, containing 10% iron have acceptable levels of inactive carbon "residue" even after more than 40 cycles of carbon deposition and steaming. However, materials containing more than 15% iron, i.e. materials 2, 3 and 4, had relatively high levels of inactive carbon residue. This demonstrates that it is important to keep the iron concentration within the narrow range of 5 to 15% by weight of the metal component. The 50 cycles achieved with material number 6 represents a yield of 500 pounds of carbon deposited per pound of metal component and a yield of $25 \times 10^3$ SCF of hydrogen per pound of metal component.

Thus, the results of this Example demonstrate that the inclusion of iron in the metal component greatly improved methane suppression. Further iron did not adversely affect catalyst stability at levels less than 15% by weight. Although chromium, when used alone to modify the cobalt catalyst, did not promote hydrogen selectivity, chromium in combination with iron greatly improved hydrogen selectivity.

EXAMPLE 2

This Example demonstrates continuous steaming-/gasification according to the present invention. The reactor apparatus comprised two reactors operating in a fluidized bed mode. The two reactors are connected with fluid bed transfer lines located below the top of the beds. Transfer is accomplished by establishing a small differential pressure between the reactors and opening the transfer line valve. Solids are transferred back and forth by changing the sign of the differential pressure. The metal component used was material 6, with a metal component composition ratio in terms of percent by weight Co/Fe/Cr of 85/10/5. Carbon deposition and steaming took place simultaneously and at equal rates. Typical rates were approximately 400 grams carbon deposited or steamed per hour; thus, the net solids transfer from the deposition reactor to the steaming reactor was about 400 grams per hour. Nominally, transfers were conducted about once an hour; approximately 700 grams were transferred from the deposition reactor to the gasifier and about 300 grams in the opposite direction. These quantities represented about 10% of the total solids in the system so that the disturbance of steady state was minor. Solids were transferred from the bottom of the reaction zone of one reactor to the top of the reaction zone of the other reactor; occasionally, the direction was reversed. The bidirectional transfer operation took about three minutes, including the time (about one minute) required for system equilibration between the single transfers.

The test ran for about 375 hours. Processing time consisted of 265 hours of steady state operation and about 110 hours of transient operation (mostly start-up and shutdown). Steady state processing time consisted of about 200 hours of operation at 4.4 atmospheres (50 psig), 50 hours at 6.1 atmospheres (75 psig), and 15 hours at 7.8 atmospheres (100 psig) reactor pressure.

The conditions in the gasification reactor were a temperature of 620° C. and gas superficial velocity of six centimeters per second. The conditions in the deposition reactor were a temperature of 400° C. and a gas superficial velocity of 15 centimeters per second. The feed to the gasifier was 100% steam, but in the reaction zone it was diluted by approximately 20% v/v nitrogen purge gas used to maintain material transfer lines free of solids. The nominal deposition reactor feed gas composition was 10% v/v CO, 5% v/v $H_2$, with the balance being nitrogen gas.

FIG. 3 summarizes the fuel utilization, percent methane in products, and percent steam utilization data generated during the test. The top portion of FIG. 3 summarizes the performance of the carbon deposition operation expressed in terms of "fuel (CO and $H_2$) utilization". Percent fuel utilization measures the performance of the carbon deposition operation. Theoretical consumption of hydrogen and carbon monoxide were computed for the carbon deposition reactor, using thermodynamic data for equilibrium operation. The data are reported in Table 2. The actual consumption of hydrogen and carbon monoxide are expressed as a percent of the carbon monoxide and hydrogen fed. The closer the percentages are to 100%, the more effective is the fuel utilization in the carbon deposition step. Carbon monoxide utilization was near equilibrium and constant. Hydrogen utilization was high and also constant through the 265 hours of steady state processing.

The middle and bottom portions of FIG. 3 summarize the data pertaining to the performance of the steam gasification operation. Over the range of pressures investigated, nominally 80% methane suppression was obtained at equilibrium steam utilization for the duration of the 265 hours of steady state operation. Neither the deposition nor the gasification data revealed any catalyst deterioration. Steam utilization data also approached equilibrium values for 80% $CH_4$ suppression as shown in FIG. 3.

The stability of carbonaceous material No. 6 is also evident from the data presented in Tables 2 and 3 where product gas composition data are presented for every 50 hours of steady state operation.

TABLE 2

STABILITY OF PRODUCT GAS COMPOSITION IN TANDEM REACTORS (STEAM GASIFICATION OF MATERIAL NO. 6 SOLIDS AT 620° C., 50 PSIG AND 75 PSIG)

| | Thermodynamically Predicted Composition | | | | Product Composition, % v/v Versus of Operation | | | | |
|---|---|---|---|---|---|---|---|---|---|
| | 50 Psig | | 75 Psig | | | | | | |
| Specie | Normal | Zero Methane | Normal | Zero Methane | 50 Hrs* | 100 Hrs* | 150 Hrs* | 200 Hrs** | 250 Hrs* |
| $CH_4$ | 15.8 | 0 | 18.3 | 0 | 4 | 3 | 2 | 3 | 2 |
| $H_2$ | 41.2 | 62.5 | 38.4 | 62.9 | 57 | 61 | 60 | 63 | 62 |
| CO | 13.0 | 12.3 | 11.5 | 11.0 | 12 | 9 | 7 | 6 | 7 |
| $CO_2$ | 30.0 | 25.2 | 31.8 | 26.1 | 27 | 27 | 31 | 28 | 29 |
| % Steam Utilization | 64.7 | 54.2 | 63.0 | 50.5 | 55 | 60 | 54 | 54 | 58 |
| % Methane Suppression | 0 | 100 | 0 | 100 | 75 | 81 | 87 | 84 | 87 |

Typical Feed Composition: 80% v/v Steam, 20% v/v $N_2$ (Nitrogen was used to pruge DP probes)

*50 psig data
**75 psig data

TABLE 3

STABILITY OF PRODUCT GAS COMPOSITION IN TANDEM REACTORS (CARBON DEPOSITION ON MATERIAL NO. 6 SOLIDS AT 400° C., 50 PSIG AND 75 PSIG)

| | Thermodynamically Predicted Composition | | | Hours of Operation (Test Data) | | | | |
|---|---|---|---|---|---|---|---|---|
| Specie | 50 Psig | 50 Psig | 75 Psig | 50 Hrs* | 100 Hrs* | 150 Hrs* | 200 Hrs** | 250 Hrs* |
| A. Feed Gas Composition, % v/v (Balance Nitrogen) | | | | | | | | |
| CO | 9 | 13 | 13 | 9 | 13 | 11 | 13 | 11 |
| $H_2$ | 4 | 6 | 6 | 4 | 6 | 5 | 6 | 4 |
| B. Product Gas Composition, % v/v (Nitrogen Free) | | | | | | | | |
| $CH_4$ | 8.5 | 10.0 | 10.6 | 2 | 4 | 4 | 6 | 4 |
| $H_2$ | 16.1 | 14.5 | 12.9 | 28 | 25 | 26 | 29 | 25 |
| CO | 1.6 | 1.4 | 1.2 | 12 | 4 | 6 | 4 | 5 |
| $CO_2$ | 73.8 | 74.1 | 75.3 | 58 | 67 | 64 | 61 | 66 |
| C. Fuel Utilization | | | | | | | | |
| % CO | 99.2 | 99.4 | 99.5 | 92 | 97 | 96 | 97 | 97 |
| % $H_2$ | 82.6 | 85.3 | 87.3 | 56 | 63 | 61 | 59 | 58 |

*50 psig data
**75 psig data

Table 2 compares actual product composition against compositions predicted by thermodynamics for equilibrium operation at 650° C., 4.4 and 6.1 atmospheres (50 and 75 psig) in the gasification reactor. Table 3 presents data for the carbon deposition operation. These tables show that product gas composition stability is excellent, CO conversion is high and approaches equilibrium values, and methane suppression is high.

Although the present invention has been described in considerable detail with reference to certain preferred versions thereof, other versions are possible. Therefore the spirit and scope of the appended claims should not necessarily be limited to the description of the preferred versions contained herein.

What is claimed is:

1. A fibrous carbon-enriched carbonaceous material for use in a continuous steam gasification process for producing a hydrogen-rich gas stream from a low heating value fuel gas, the fibrous carbon-enriched carbonaceous material having been produced by carbon deposition from a low heating value fuel gas comprising carbon monoxide at a temperature above about 350° C. onto a carbon lean material comprising a metal component, the fibrous carbon-enriched carbonaceous material comprising:
   about 55 to about 98 percent by weight carbon, about 1 to about 44 percent by weight metal component, and about 0.1 to about 1 percent by weight hydrogen; and including a major phase and a minor phase,
   (i) the major phase comprising from about 95 to about 99.9 percent by weight carbon, about 0.1 to about 1 percent by weight hydrogen, and the balance being the metal component; and
   (ii) the minor phase being nodules which are dispersed throughout the major phase and are intimately associated with, and at least partly bonded to the carbon in the major phase, the minor phase comprising carbon and at least about 50 percent by weight metal component, wherein the metal component comprises from about 75 to about 95 percent by weight cobalt, and an effective amount of iron in an amount of from about 5 to about 15 percent by weight and an effective amount of chromium in an amount of from about 1 to about 10 percent by weight for suppressing the production of methane and enhancing the production of hydrogen, so that the carbon-enriched carbonaceous material is capable of producing a gas stream that consists primarily of hydrogen and not more than about 5 mole percent methane on a dry basis.

2. The carbonaceous material of claim 1 wherein the metal component comprises about 85 percent to about 95 percent by weight cobalt.

3. The carbonaceous material of claim 1 wherein the metal component comprises about 85 percent by weight cobalt, about 10 percent by weight iron, and about 5 percent by weight chromium.

4. A carbon-enriched carbonaceous material for use in a continuous steam gasification process for producing a hydrogen-rich gas stream from a low heating value fuel gas, the carbon-enriched carbonaceous material having been produced by carbon deposition from a low heating value fuel gas comprising carbon monoxide at a temperature above about 350° C. onto a carbon lean material comprising a metal component, the fibrous carbon-enriched carbonaceous material comprising:

about 55 to about 98 percent by weight carbon, about 1 to about 44 percent by weight metal component, and about 0.1 to about 1 percent by weight hydrogen, wherein the metal component comprises from about 75 to about 95 percent by weight cobalt and an effective amount of iron in an amount of from about 5 to about 15 percent by weight and an effective amount of chromium in an amount of from about 1 to about 10 percent by weight for suppressing the production of methane and enhancing the production of hydrogen, so that the carbon-enriched carbonaceous material is capable of producing a gas stream that consists primarily of hydrogen not more than 5 mole percent methane on a dry basis.

* * * * *